(12) United States Patent
Taipale et al.

(10) Patent No.: US 10,402,942 B2
(45) Date of Patent: Sep. 3, 2019

(54) MULTIPLE GEOREFERENCED AERIAL IMAGE CROP ANALYSIS AND SYNTHESIS

(71) Applicant: Sentera, Inc., Minneapolis, MN (US)

(72) Inventors: Eric Taipale, Minneapolis, MN (US); Andrew Muehlfeld, Minneapolis, MN (US)

(73) Assignee: Sentera, Inc., Minneapolis, MN (US)

(*) Notice: Subject to any disclaimer, the term of this patent is extended or adjusted under 35 U.S.C. 154(b) by 0 days.

(21) Appl. No.: 15/718,650

(22) Filed: Sep. 28, 2017

(65) Prior Publication Data

US 2019/0096033 A1    Mar. 28, 2019

(51) Int. Cl.
G06K 9/00 (2006.01)
G06T 3/40 (2006.01)
G06K 9/46 (2006.01)

(52) U.S. Cl.
CPC ........ G06T 3/4038 (2013.01); G06K 9/00657 (2013.01); G06K 9/4609 (2013.01); G06T 2200/32 (2013.01)

(58) Field of Classification Search
CPC combination set(s) only.
See application file for complete search history.

(56) References Cited

U.S. PATENT DOCUMENTS

| 9,875,430 | B1* | 1/2018 | Keisler | G06K 9/6276 |
| 2010/0142842 | A1* | 6/2010 | Damkjer | G06T 3/4038 382/260 |
| 2014/0285673 | A1 | 9/2014 | Hundley et al. | |
| 2017/0313310 | A1* | 11/2017 | Awan | B60W 30/12 |

FOREIGN PATENT DOCUMENTS

| CN | 101110079 A | 1/2008 |
| WO | WO-2016025848 A1 | 2/2016 |

* cited by examiner

*Primary Examiner* — Alex Kok S Liew
(74) *Attorney, Agent, or Firm* — Hamre, Schumann, Mueller & Larson, P.C.

(57) ABSTRACT

Aerial imagery may be captured from an unmanned aircraft or other aerial vehicle. The use of aerial vehicle imagery provides greater control over distance from target and time of image capture, and reduces or eliminates imagery interference caused by clouds or other obstacles. Images captured by the aerial vehicle may be analyzed to provide various agricultural information, such as vegetative health, plant counts, population counts, plant presence estimation, weed presence, disease presence, chemical damage, wind damage, standing water presence, nutrient deficiency, or other agricultural or non-agricultural information. Georeference-based mosaicking may be used to process and combine raw image files into a direct georeferenced mosaic image.

20 Claims, 5 Drawing Sheets

MULTIPLE GEOREFERENCED AERIAL IMAGE CROP ANALYSIS AND SYNTHESIS

TECHNICAL FIELD

Embodiments described herein generally relate to aerial image analysis.

BACKGROUND

Precision agriculture seeks to improve farming management through the use of image analysis. Precision agriculture may use satellite imagery to capture an image of a crop field or other large agricultural region. However, obtaining and analyzing satellite imagery is expensive, complex, and subject to various limitations. For example, satellite image quality is limited by the orbital distance from earth, satellite image frequency and location is limited by the satellite orbital period, and satellite image availability is limited by space weather or meteorological events (e.g., clouds, storms). It is desirable to provide improved imagery and analysis for precision agriculture.

DESCRIPTION OF EMBODIMENTS

The present subject matter provides a technical solution for various technical problems in providing improved imagery for aerial imagery, such as aerial imagery used in precision agriculture. Aerial imagery may be captured from a manned or unmanned aerial vehicle (e.g., UAV, aircraft). The use of an aerial vehicle reduces or eliminates several of the challenges facing satellite imagery. For example, aerial vehicle imagery provides greater control over distance from target and time of image capture, and reduces or eliminates imagery interference caused by clouds or other obstacles. Similar advantages over satellite imagery may be realized through the use of elevated, non-airborne imagery, such as imagery captured from vehicles, farm-mounted equipment, personal tracking devices, or other elevated imagery.

Aerial or elevated imagery may be analyzed to provide various agricultural information, such as vegetative health, plant counts, population counts, plant presence estimation, weed presence, disease presence, chemical damage, standing water presence, wind damage, nutrient deficiency (e.g., nitrogen, phosphate, magnesium, potassium, water), or other agricultural information. The output analysis files may be provided in the form of human viewable images (e.g., JPEG images) of a geographic area, machine-readable geographic images (e.g., GeoTIFF files), or georeferenced data files (e.g., shapefiles). In addition to agricultural analysis, these systems and methods may be used to provide output analysis files useful in construction, infrastructure inspection, and other industries. While systems and methods are generally described herein with respect to georeferenced aerial imagery, similar systems and methods may be applied to any other georeferenced imagery, such as elevated imagery captured from farm-mounted georeferenced equipment or other mobile georeferenced-image capture devices.

The following description and the drawings sufficiently illustrate specific embodiments to enable those skilled in the art to understand the specific embodiment. Other embodiments may incorporate structural, logical, electrical, process, and other changes. Portions and features of various embodiments may be included in, or substituted for, those of other embodiments. Embodiments set forth in the claims encompass all available equivalents of those claims.

Figure 1:
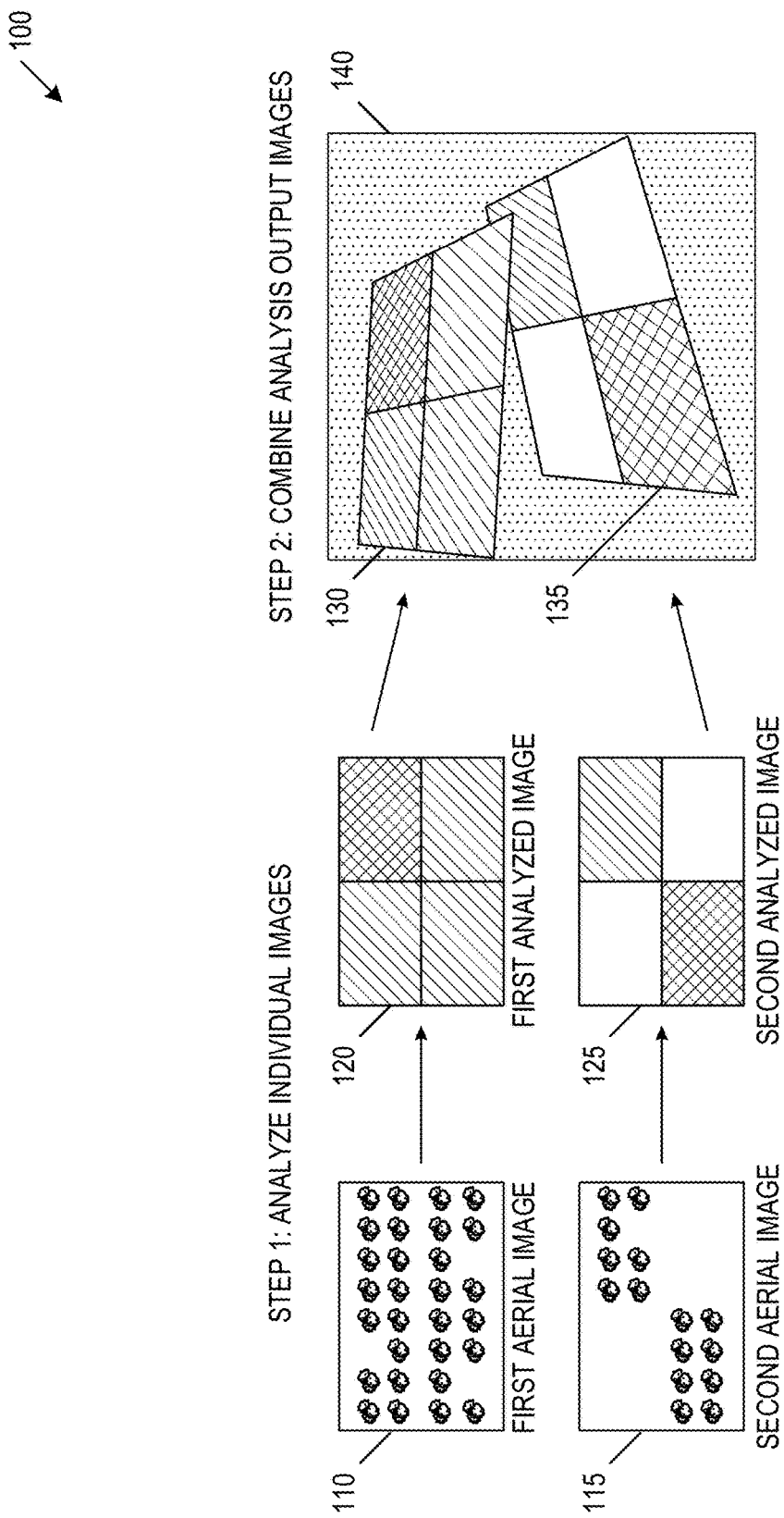
FIG. 1 is a block diagram of an image synthesis method, in accordance with at least one embodiment of the invention.

FIG. 1 is a block diagram of an image synthesis method 100, in accordance with at least one embodiment of the invention. Method 100 includes receiving multiple images 110 and 115 of an agricultural area (e.g., a crop field). Aerial vehicles generally capture agricultural imagery at lower altitudes than satellites, and while this reduces or eliminates weather-based crop occlusion, aerial vehicle imagery usually requires multiple images to cover a desired agricultural area. Each of the images 110 and 115 typically includes high resolution unprocessed images (e.g., "raw" images) as output from an aerial image capture device. The raw images may be analyzed (e.g., processed) to provide an analyzed output, such as a graphical representation of agricultural data. For example, image 110 may be analyzed to perform a plant count to generate a first plant count analyzed image 120, and image 115 may be similarly analyzed to generate a second plant count analyzed image 125.

Aerial or elevated imagery is often post-processed to account for aerial image characteristics, such as aerial camera angle variations, aerial camera altitude variations, topographic features (e.g., hills), or other aerial image characteristics. To account for these image characteristics, software may be used to project the images onto a map plane or 3D surface, such as the rectangular agricultural map 140. The software may modify the images to improve the accuracy of the projection of the image content, such as by scaling, warping, shifting, orthorectifying, or performing other image manipulation. An orthorectification process may be applied to the first analyzed image 120 and the second analyzed image 125 to form first orthorectified image 130 and second orthorectified image 135. Once orthorectified, georeference data may be used to position and superimpose first orthorectified image 130 and second orthorectified image 135 onto rectangular agricultural map 140. In an embodiment, rectangular agricultural map 140 may further include a default value (e.g., baseline value) for the region, such as a default number of plants per square meter.

Multiple aerial or elevated images may be combined to form a single image. The multiple images may be combined using image feature based stitching, which stitches images together using software image feature recognition. In image stitching, matching geographic regions may be identified using various software-based feature recognition algorithms. For example, the first aerial image 110 and second aerial image 115 may be combined, however combining raw image files often requires transferring large image files and requires expensive and time-consuming feature recognition software. In addition or alternative to image stitching, georeference-based mosaicking may be used to process and combine raw image files into a direct georeferenced mosaic image. By using georeference to perform mosaicking, the user can avoid the transfer and processing of large raw image files used in image stitching. For example, the first analyzed image 120 and the second analyzed image 125 may be positioned by direct georeferencing and superimposed onto a mosaicked image, such as onto rectangular agricultural map 140. In various embodiments, the data from the first analyzed image 120 and the second analyzed image 125 may be combined into another form of geographic information data file, such as a GeoTIFF, a raster file, a geographic vector file, or other type of geographic information data file.

In precision agriculture applications, processing raw image files to produce a mosaicked agricultural information output file often significantly reduces the file size and resulting image complexity. For example, the raw imagery may have a Ground Sample Distance (GSD) of 2 cm, which corresponds to approximately 40 million pixels per acre. If each pixel includes three values (e.g., red, green, blue), each acre of raw imagery would correspond to approximately 120 million values. These sizeable raw images are then sent to an image stitching system, which may require significant transmission bandwidth, storage space, and processing power. In contrast to the use of raw images, mosaicking may be used to reduce image file size before transmission. For example, if a particular type of vegetative population count is used to determine the number of plants within each square meter, each acre may include up to 4,047 plant count values. Various types of analysis per unit of area may be used. Similarly, a source image may be divided into sub-regions of a predetermined pixel size or geographic area, and a multi-pixel analysis (e.g., pixel region analysis) may be used based on various approximations of number of plants in each sub-region, which may further reduce the size of the resultant images. A pixel-by-pixel analysis may be performed on the raw image to provide an agricultural index, such as a normalized difference vegetation index (NDVI). Additional quantization or data compression may be used to reduce the size of the output mosaicked image. Further, because the output image already represents the mosaicked combination of the raw images, no processor-intensive stitching is needed.

Figure 2:
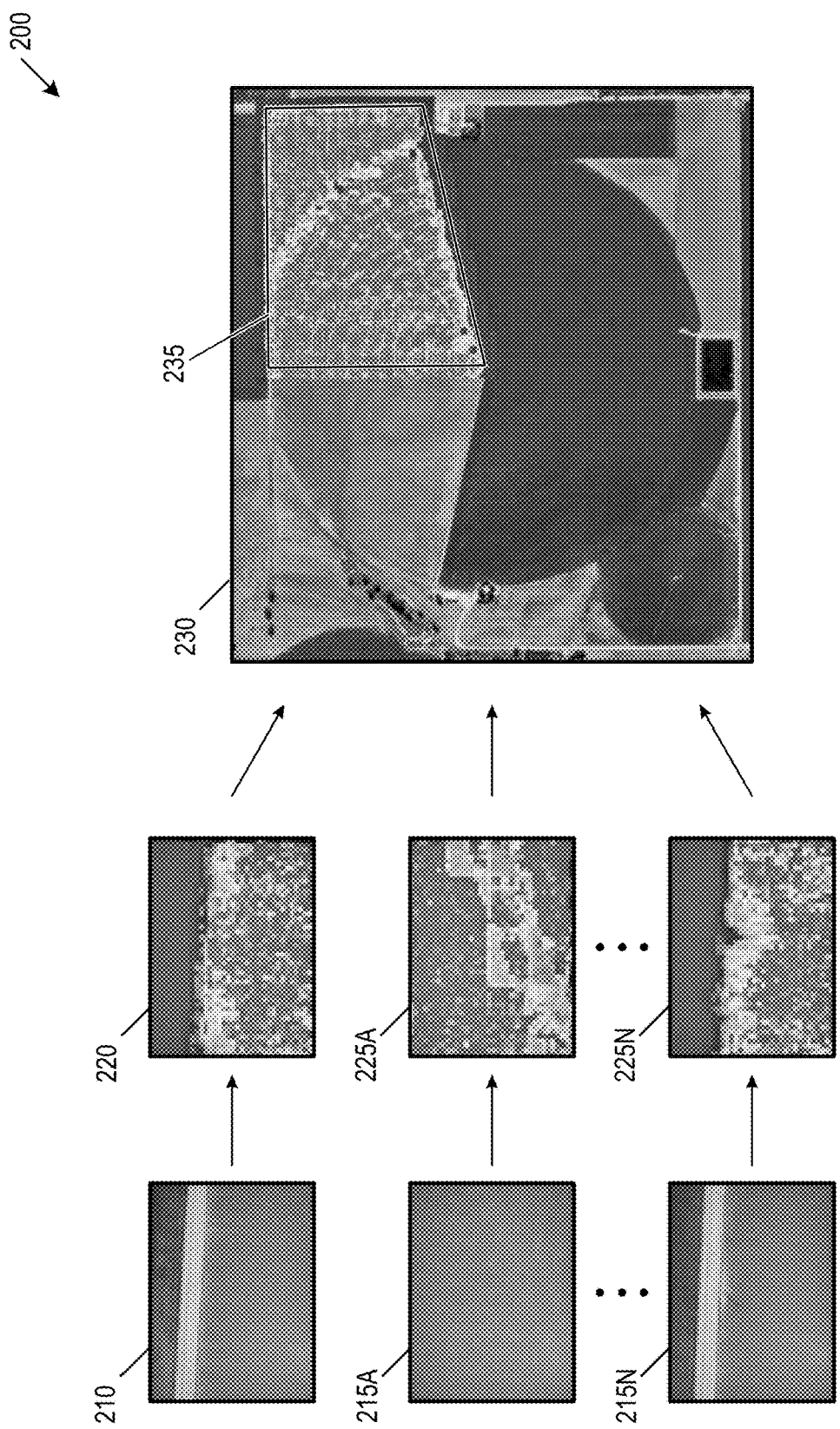
FIG. 2 is a block diagram of a mosaicked georeferenced image synthesis method, in accordance with at least one embodiment of the invention.

FIG. 2 is a block diagram of a mosaicked georeferenced image synthesis method 200, in accordance with at least one embodiment of the invention. Aerial vehicles may be used to capture high resolution, unprocessed, "raw" agricultural images. The raw images may include a first raw image 210, and may include a series of N overlapping images 215A-215N, where the overlapping images 215A-215N represent overlapping sections of an agricultural area. The raw images may be processed to provide vegetative health data or other agricultural data, generating a first analyzed image 220 and a series of N overlapping images 225A-225N. The aerial vehicle may include one or more navigation sensors to provide georeference data (e.g., latitude, longitude, altitude, camera orientation). The georeference data may be associated with each of the raw images, and may be associated with each of the corresponding analyzed images. Using the georeferenced data, the images may be mosaicked together to form an aggregated aerial image (e.g., a mosaic) 230. The aggregated aerial image 230 may include one or more groups of mosaicked analyzed images 235 superimposed on a larger image of the agricultural area. The larger image of the agricultural area may be captured by the aerial vehicle or may be provided by an external source, and georeference information associated with the larger image may be used to determine the location of the superimposed mosaic of analyzed images 235. While the mosaic of analyzed images 235 is shown as a contiguous block, the use of georeferenced captured images enables generating an output without requiring the images to be overlapping. For example, first analyzed image 220 may be separated from a series of N overlapping images 225A-225N within the group of mosaicked analyzed images 235. This enables greater flexibility in capturing discontinuous regions, which may reduce time and costs associated with the aerial vehicle operation. Further, the use of georeferenced data in mosaicking reduces or eliminates the need for stitching multiple images using image processing techniques. By reducing or eliminating the need for image-feature-based stitching, the processing required to generate the output aggregated aerial image 230 is reduced significantly. These reductions in required processing enable a reduction in required power source and processor performance, which may further reduce time and costs associated with the aerial vehicle operation. In an embodiment, the reduced power and processor requirements may enable the aerial vehicle to perform image capture, processing, and georeference mosaicking in real-time (e.g., while in flight). In an example, using the output aggregated aerial image 230 generated in-flight, a ground operator (e.g., pilot or processor-based navigation system) may identify areas of particular interest in real-time and command the aerial vehicle to perform additional analysis of that area.

Figure 3:
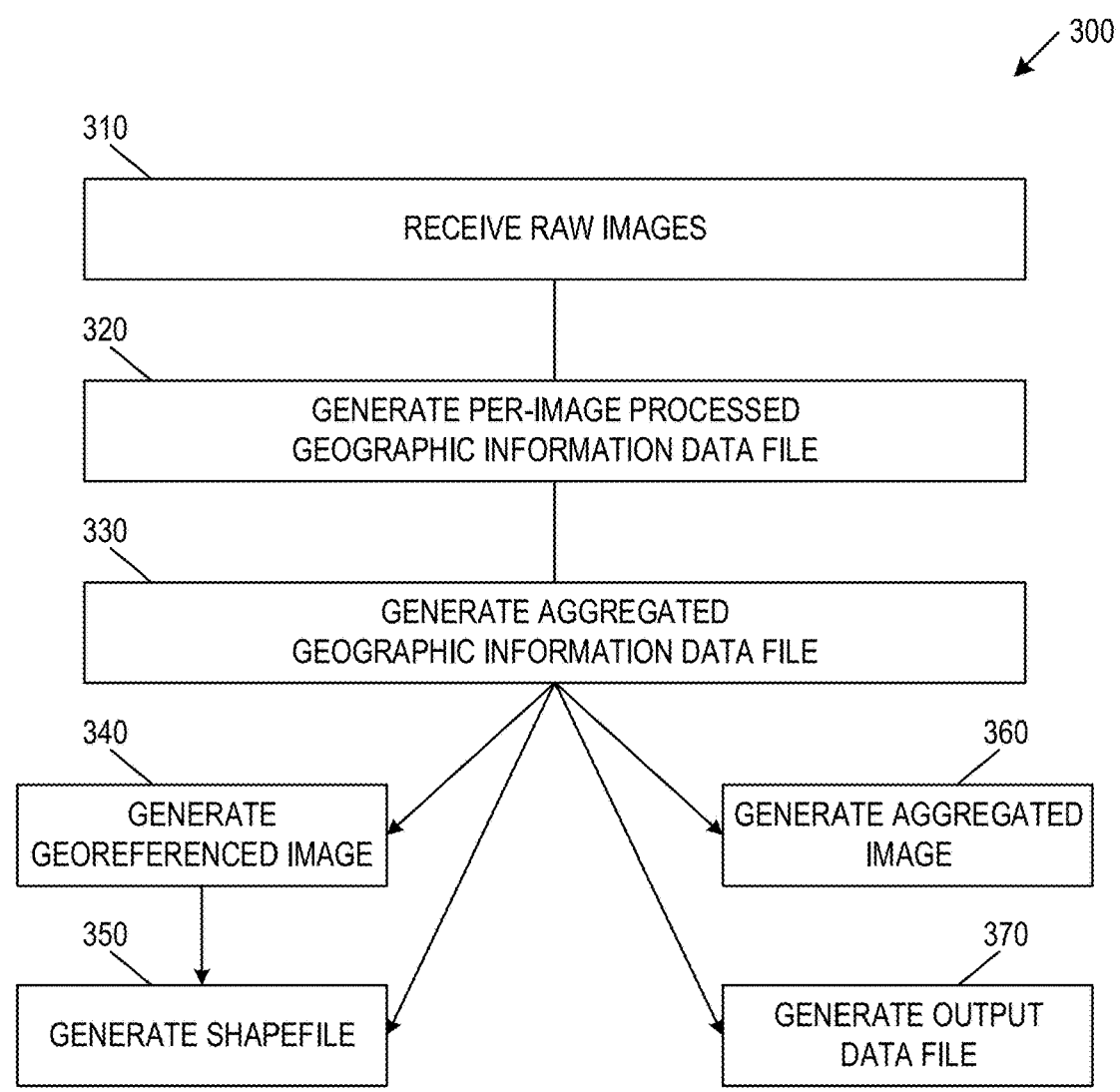
FIG. 3 is a block diagram of a georeferenced image synthesis method, in accordance with at least one embodiment of the invention.

FIG. 3 is a block diagram of a georeferenced image synthesis method 300, in accordance with at least one embodiment of the invention. Method 300 includes receiving a plurality of raw aerial images 310. In various embodiments, each image within the plurality of raw aerial images may have an associated geolocation, or sub-regions with each image may have respective geolocations. Method 300 includes generating a plurality of per-image processed geographic information data files 320. In an embodiment, the geographic information data file 320 includes a raster data file. Method 300 includes generating an aggregated geographic information data file 330 based on the plurality of per-image processed geographic information data files and based on the associated plurality of geolocations. In an embodiment, the aggregated geographic information data file 330 includes an aggregated raster data file.

Method 300 may generate one or more output files based on the aggregated geographic information data file. In an embodiment, method 300 includes generating a georeferenced image 340. The georeferenced image may include a human-viewable image that includes geographic information, such as a GeoTIFF file. In an embodiment, method 300 includes generating a shapefile 350. The shapefile may include data that can be used to render a viewable image, such as a vector representation of an area. The shapefile may also include various attributes associated with sub-regions within the area. The generation of the shapefile 350 may be based on the output of generating the aggregated geographic information data file 330, based on the output of generating the georeferenced image 340, or based on a combination of the two. In an embodiment, method 300 includes generating an aggregated aerial image 360. The aggregated aerial image includes the plurality of processed aerial images arranged relative to each other based on the associated plurality of geolocations, such as the human-viewable aggregated aerial image 230 shown in FIG. 2. In an embodiment, method 300 includes generating an output data file 370. The output data file 370 may include information similar to or in addition to information included in the shapefile 350, the metadata included within the aggregated image 360, or other information. In various embodiments, the output data file 370 may include a file with one row per geographic location (e.g., one row per pixel) and data separated into multiple columns. For example, the data may include separate columns for planters per acre, latitude, longitude, easting, northing, NDVI, or other data columns. The output data file 370 may include human-readable data, such as a text file, a comma-separated value (CSV) file, or another human-readable file. The output data file 370 may include machine-readable data, such as a binary file formatted for processing by machines.

Figure 4:
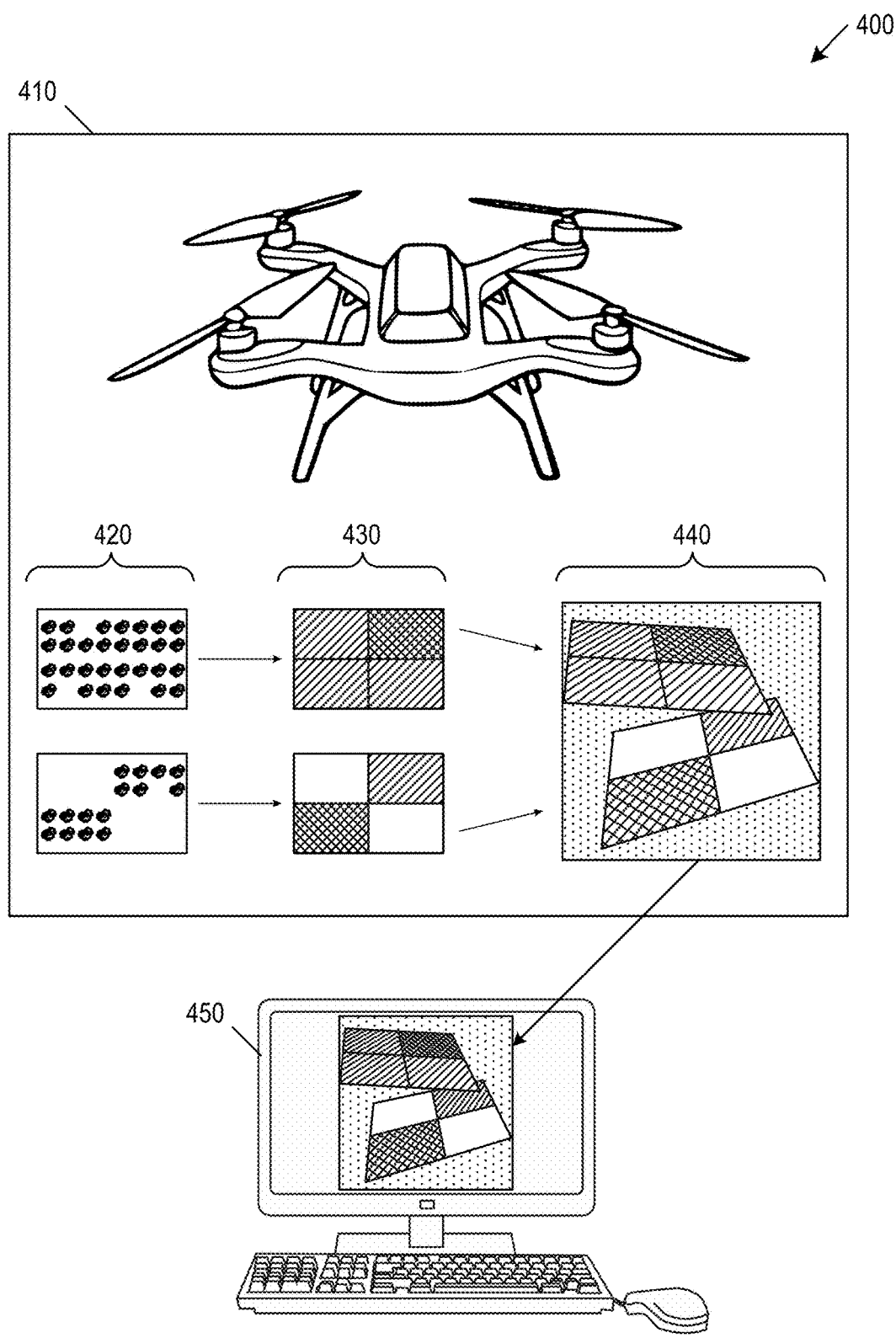
FIG. 4 is a block diagram of a georeferenced image synthesis aerial vehicle, according to an example embodiment.

FIG. 4 is a block diagram of a georeferenced image synthesis aerial vehicle system 400, according to an example embodiment. System 400 includes an aerial vehicle 410 and a remote computing device 450. Aerial vehicle 410 includes an image capture device and location device to capture raw aerial images 420 with associated georeference data. Aerial vehicle 410 also includes a processor that uses the georeferenced aerial images 420 to generate corresponding analyzed georeferenced images 430. The processor then uses the georeference data to combine the analyzed georeferenced images 430 into an output mosaicked geospatial information file 440. The aerial vehicle 410 further includes a wireless communication device that transmits the output mosaicked geospatial information file 440 to the remote computing device 450.

The use of an aerial vehicle 410 to generate and send the output file 440 offers various advantages. By using direct georeferencing to combine analyzed images instead of stitching multiple images, the processing time and associated power may be reduced significantly. This further enables the use of mobile processors and lighter battery payloads, which reduces costs and increases practical operational time for aerial vehicles. Further, instead of transferring high resolution source images needed for stitching, the relatively small size of the output mosaicked geospatial information file 440 enables a significantly reduced data transfer requirement. In an embodiment, instead of transferring gigabytes of source image files, the output mosaicked geospatial information file 440 requires kilobytes of shapefile data, thereby reducing the required data throughput by several orders of magnitude. This enables real-time transmission and viewing of partial or complete output mosaicked geospatial information file 440, and enables a cost-effective use of cellular modem transmission (e.g., LTE) on the aerial vehicle 410. In contrast, the gigabytes of source image files required for stitching would be technically or financially impractical or impossible using cellular modem transmission, and would still require stitching to be performed on a remote device.

Figure 5:
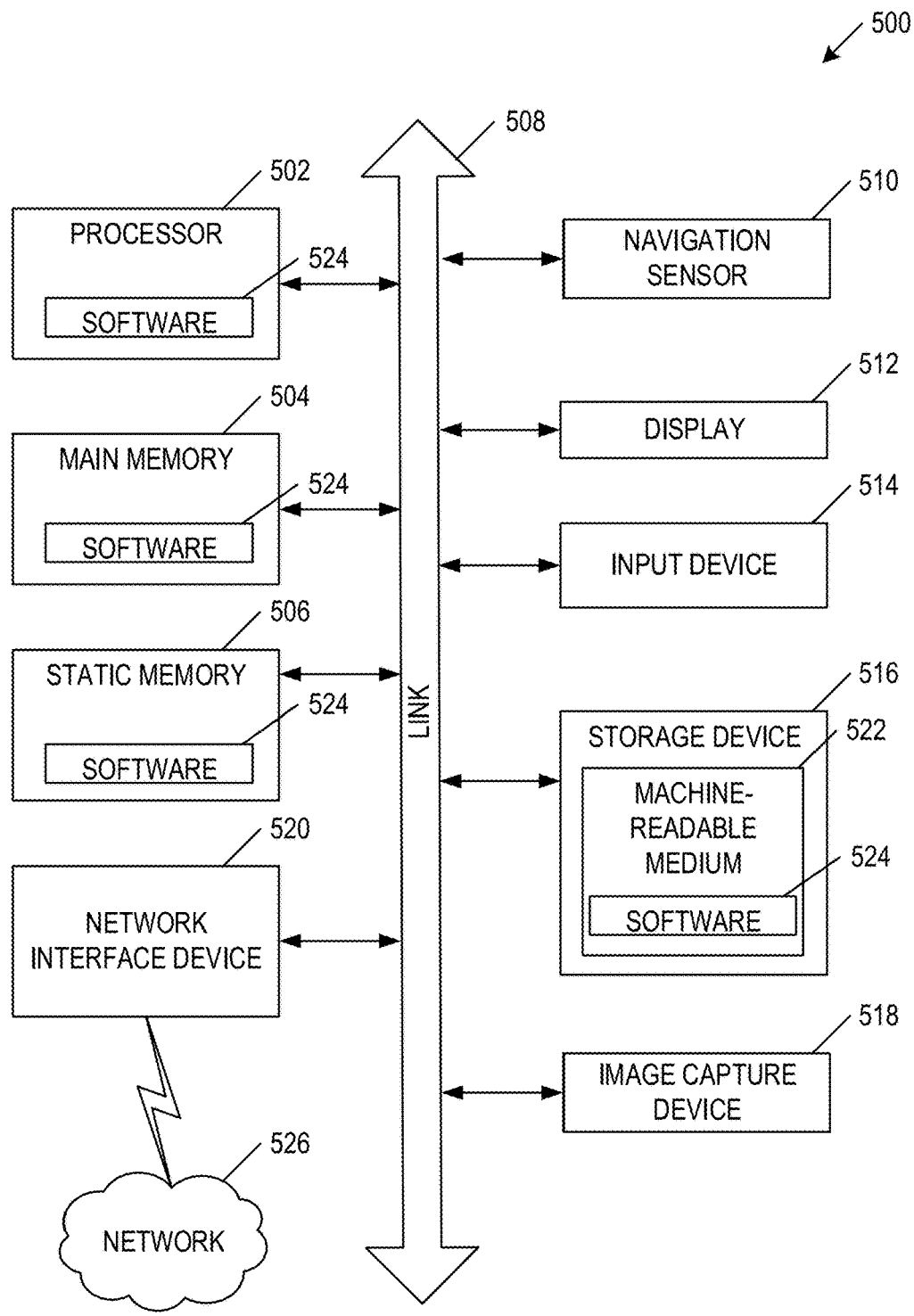
FIG. 5 is a block diagram illustrating a georeferenced image synthesis system in an example form of an electronic device, according to an example embodiment.

FIG. 5 is a block diagram illustrating a georeferenced image synthesis system in an example form of an electronic device 500, within which a set or sequence of instructions may be executed to cause the machine to perform any one of the methodologies discussed herein, according to an example embodiment. Electronic device 500 may represent vehicles used to capture images, synthesize images, or both. In alternative embodiments, the electronic device 500 operates as a standalone device or may be connected (e.g., networked) to other machines. For example, the components of electronic device 500 may all be resident on an aerial vehicle, or may be distributed partially on an aerial vehicle and partially on a remote computing device. In a networked deployment, the electronic device 500 may operate in the capacity of either a server or a client machine in server-client network environments, or it may act as a peer machine in peer-to-peer (or distributed) network environments. The electronic device 500 may be implemented on a System-on-a-Chip (SoC), a System-in-a-Package (SiP), an integrated circuit (IC), a portable electronic device, a personal computer (PC), a tablet PC, a hybrid tablet, a personal digital assistant (PDA), a mobile telephone, or any electronic device 500 capable of executing instructions (sequential or otherwise) that specify actions to be taken by that machine to detect a user input. Further, while only a single electronic device 500 is illustrated, the terms "machine" or "electronic device" shall also be taken to include any collection of machines or devices that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to execute instructions, individually or jointly, to perform any one or more of the methodologies discussed herein.

Example electronic device 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The main memory 504 or static memory 506 may be used to store navigation data (e.g., predetermined waypoints) or payload data (e.g., stored captured images).

The electronic device 500 includes a navigation sensor 510. Navigation sensor 510 may include an IMU, which may include an accelerometer and gyroscope to output vehicle roll, pitch, yaw, acceleration, or other inertial data. The navigation sensor 510 may include a compass to provide heading, or may include a GNSS to provide location. The navigation sensor 510 may include a tightly coupled IMU and GNSS system.

The electronic device 500 may further include a display unit 512, where the display unit 512 may include a single component that provides a user-readable display and a protective layer, or another display type. The electronic device 500 may further include an input device 514, such as a pushbutton, a keyboard, an NFC card reader, or a user interface (UI) navigation device (e.g., a mouse or touch-sensitive input). The electronic device 500 may additionally include a storage device 516, such as a drive unit. The electronic device 500 may additionally include a signal generation device 518 to provide audible or visual feedback, such as a speaker to provide an audible feedback or one or more LEDs to provide a visual feedback. The electronic device 500 may additionally include a network interface device 520, and one or more additional sensors (not shown).

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, or within the processor 502 during execution thereof by the electronic device 500. The main memory 504, static memory 506, and the processor 502 may also constitute machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, and wireless data networks (e.g., Wi-Fi, NFC, Bluetooth, Bluetooth LE, 3G, 5G LTE/LTE-A, WiMAX networks, etc.). The term "transmission medium" shall be taken to include any intangible medium that is capable of storing, encoding, or carrying instructions for execution by the machine, and includes digital or analog communications signals or other intangible medium to facilitate communication of such software.

To better illustrate the method and apparatuses disclosed herein, a non-limiting list of embodiments is provided here.

Example 1 is a georeferenced image synthesis device comprising: an image capture device to capture a plurality of ground images, the plurality of ground images including an associated plurality of geolocations; and a processor to: generate a plurality of processed geospatial data files based on the plurality of ground images, the plurality of processed geospatial data files identifying an information data set for each of the plurality of ground images; and generate an aggregated geospatial data file based on the plurality of processed geospatial data files and on the associated plurality of geolocations, the aggregated geospatial data file including geospatial information representing how the plurality of processed geospatial data files are geographically arranged relative to each other.

In Example 2, the subject matter of Example 1 optionally includes wherein: generating the plurality of processed geospatial data files includes generating a plurality of processed images; and generating the aggregated geospatial data file includes generating an aggregated image based on the plurality of processed images and on the associated plurality of geolocations, the aggregated image including the plurality of processed images arranged relative to each other based on the associated plurality of geolocations.

In Example 3, the subject matter of any one or more of Examples 1-2 optionally include wherein generating the aggregated geospatial data file includes generating an aggregated geographic information data file based on the plurality of processed images and on the associated plurality of geolocations.

In Example 4, the subject matter of any one or more of Examples 1-3 optionally include wherein generating the aggregated geospatial data file includes arranging the plurality of processed images relative to each other further based on a feature-based image stitching process.

In Example 5, the subject matter of any one or more of Examples 1-4 optionally include wherein the plurality of ground images includes a plurality of aerial images captured by an aerial vehicle.

In Example 6, the subject matter of any one or more of Examples 1-5 optionally include wherein the plurality of ground images includes a plurality of elevated images.

In Example 7, the subject matter of any one or more of Examples 1-6 optionally include wherein generating the plurality of processed images is further based on a pixel-by-pixel analysis of the plurality of ground images to identify the information data set for each of the plurality of ground images.

In Example 8, the subject matter of any one or more of Examples 1-7 optionally include wherein generating the plurality of processed images is further based on a pixel regional analysis of the plurality of ground images to identify the an information data set for each of the plurality of ground images.

In Example 9, the subject matter of any one or more of Examples 1-8 optionally include wherein the plurality of ground images further includes at least one overlapping portion.

In Example 10, the subject matter of Example 9 optionally includes wherein generating an aggregated image is further based on the at least one overlapping portion.

Example 11 is a georeferenced image synthesis method comprising: receiving a plurality of ground images, the plurality of ground images including an associated plurality of geolocations; generating a plurality of processed geospatial data files based on the plurality of ground images, the plurality of processed geospatial data files identifying an information data set for each of the plurality of ground images; and generating an aggregated geospatial data file based on the plurality of processed geospatial data files and on the associated plurality of geolocations, the aggregated geospatial data file including geospatial information representing how the plurality of processed geospatial data files are geographically arranged relative to each other.

In Example 12, the subject matter of Example 11 optionally includes wherein: generating the plurality of processed geospatial data files includes generating a plurality of processed images; and generating the aggregated geospatial data file includes generating an aggregated image based on the plurality of processed images and on the associated plurality of geolocations, the aggregated image including the plurality of processed images arranged relative to each other based on the associated plurality of geolocations.

In Example 13, the subject matter of any one or more of Examples 11-12 optionally include wherein generating the aggregated geospatial data file includes generating an aggregated geographic information data file based on the plurality of processed images and on the associated plurality of geolocations.

In Example 14, the subject matter of any one or more of Examples 11-13 optionally include wherein generating the aggregated geospatial data file includes arranging the plurality of processed images relative to each other further based on a feature-based image stitching process.

In Example 15, the subject matter of any one or more of Examples 11-14 optionally include wherein the plurality of ground images includes a plurality of aerial images captured by an aerial vehicle.

In Example 16, the subject matter of any one or more of Examples 11-15 optionally include wherein the plurality of ground images includes a plurality of elevated images.

In Example 17, the subject matter of any one or more of Examples 11-16 optionally include wherein generating the plurality of processed images is further based on a pixelby-pixel analysis of the plurality of ground images to identify the information data set for each of the plurality of ground images.

In Example 18, the subject matter of any one or more of Examples 11-17 optionally include wherein generating the plurality of processed images is further based on a pixel regional analysis of the plurality of ground images to identify the information data set for each of the plurality of ground images.

In Example 19, the subject matter of any one or more of Examples 11-18 optionally include wherein the plurality of ground images further includes at least one overlapping portion.

In Example 20, the subject matter of Example 19 optionally includes wherein generating an aggregated image is further based on the at least one overlapping portion.

Example 21 is at least one machine-readable medium including instructions, which when executed by a computing system, cause the computing system to perform any of the methods of Examples 11-20.

Example 22 is an apparatus comprising means for performing any of the methods of Examples 11-20.

Example 23 is at least one machine-readable storage medium, comprising a plurality of instructions that, responsive to being executed with processor circuitry of a computer-controlled device, cause the computer-controlled device to: receive a plurality of ground images, the plurality of ground images including an associated plurality of geolocations; generate a plurality of processed geospatial data files based on the plurality of ground images, the plurality of processed geospatial data files identifying an information data set for each of the plurality of ground images; and generate an aggregated geospatial data file based on the plurality of processed geospatial data files and on the associated plurality of geolocations, the aggregated geospatial data file including geospatial information representing how the plurality of processed geospatial data files are geographically arranged relative to each other.

Example 24 is a georeferenced image synthesis apparatus comprising: means for receiving a plurality of ground images, the plurality of ground images including an associated plurality of geolocations; means for generating a plurality of processed geospatial data files based on the plurality of ground images, the plurality of processed geospatial data files identifying an information data set for each of the plurality of ground images; and means for generating an aggregated geospatial data file based on the plurality of processed geospatial data files and on the associated plurality of geolocations, the aggregated geospatial data file including geospatial information representing how the plurality of processed geospatial data files are geographically arranged relative to each other.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A georeferenced image synthesis device comprising:
an image capture device to capture a plurality of ground images, the plurality of ground images including an associated plurality of geolocations; and
a processor to:
generate a plurality of processed geospatial data files based on a pixel regional analysis the plurality of ground images and the plurality of geolocations, the plurality of processed geospatial data files identifying an information data set for each of the plurality of ground images, the information data set including a plurality of data values, each of the plurality of data values associated with a respective sub-region of each of the plurality of ground images; and
generate an aggregated geospatial data file based on the plurality of processed geospatial data files and on the associated plurality of geolocations, the aggregated geospatial data file including geospatial information representing how the plurality of processed geospatial data files are geographically arranged relative to each other.

2. The device of claim 1, wherein:
generating the plurality of processed geospatial data files includes generating a plurality of processed images; and
generating the aggregated geospatial data file includes generating an aggregated image based on the plurality of processed images and on the associated plurality of geolocations, the aggregated image including the plurality of processed images arranged relative to each other based on the associated plurality of geolocations.

3. The device of claim 1, wherein generating the aggregated geospatial data file includes generating an aggregated geographic information data file based on the plurality of processed images and on the associated plurality of geolocations.

4. The device of claim 1, wherein generating the aggregated geospatial data file includes arranging the plurality of processed images relative to each other further based on a feature-based image stitching process.

5. The device of claim 1, wherein the plurality of ground images includes a plurality of aerial images captured by an aerial vehicle.

6. The device of claim 1, wherein the plurality of ground images includes a plurality of elevated images.

7. The device of claim 1, wherein generating the plurality of processed images is further based on a pixel-by-pixel analysis of the plurality of ground images to identify the information data set for each of the plurality of ground images.

8. The device of claim 1, wherein the information data set for each of the plurality of ground images includes at least one of a vegetation index, a vegetative health, a plant count, a population count, a plant presence, a weed presence, a disease presence, a chemical damage, a wind damage, a standing water presence, and a nutrient deficiency.

9. The device of claim 1, wherein the plurality of ground images further includes at least one overlapping portion.

10. The device of claim 9, wherein generating an aggregated image is further based on the at least one overlapping portion.

11. A georeferenced image synthesis method comprising:
receiving a plurality of ground images, the plurality of ground images including an associated plurality of geolocations;
generating a plurality of processed geospatial data files based on a pixel regional analysis the plurality of ground images and the plurality of geolocations, the plurality of processed geospatial data files identifying an information data set for each of the plurality of ground images, the information data set including a plurality of data values, each of the plurality of data values associated with a respective sub-region of each of the plurality of ground images; and
generating an aggregated geospatial data file based on the plurality of processed geospatial data files and on the associated plurality of geolocations, the aggregated geospatial data file including geospatial information representing how the plurality of processed geospatial data files are geographically arranged relative to each other.

12. The method of claim 11, wherein:
generating the plurality of processed geospatial data files includes generating a plurality of processed images; and
generating the aggregated geospatial data file includes generating an aggregated image based on the plurality of processed images and on the associated plurality of geolocations, the aggregated image including the plurality of processed images arranged relative to each other based on the associated plurality of geolocations.

13. The method of claim 11, wherein generating the aggregated geospatial data file includes generating an aggregated geographic information data file based on the plurality of processed images and on the associated plurality of geolocations.

14. The method of claim 11, wherein generating the aggregated geospatial data file includes arranging the plurality of processed images relative to each other further based on a feature-based image stitching process.

15. The method of claim 11, wherein the plurality of ground images includes a plurality of aerial images captured by an aerial vehicle.

16. The method of claim 11, wherein the plurality of ground images includes a plurality of elevated images.

17. The method of claim 11, wherein generating the plurality of processed images is further based on a pixel-by-pixel analysis of the plurality of ground images to identify the information data set for each of the plurality of ground images.

18. The method of claim 11, wherein the information data set for each of the plurality of ground images includes at least one of a vegetation index, a vegetative health, a plant count, a population count, a plant presence, a weed presence, a disease presence, a chemical damage, a wind damage, a standing water presence, and a nutrient deficiency.

19. The method of claim 11, wherein the plurality of ground images further includes at least one overlapping portion.

20. The method of claim 19, wherein generating an aggregated image is further based on the at least one overlapping portion.

* * * * *